(12) United States Patent
Schiffman et al.

(10) Patent No.: US 11,057,196 B2
(45) Date of Patent: Jul. 6, 2021

(54) ESTABLISHING SHARED KEY DATA FOR WIRELESS PAIRING

(71) Applicant: HEWLETT-PACKARD DEVELOPMENT COMPANY, L.P., Houston, TX (US)

(72) Inventors: Joshua Serratelli Schiffman, Bristol (GB); Vali Ali, Houston, TX (US); Boris Balacheff, Boulogne-Billancourt (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 234 days.

(21) Appl. No.: 16/074,544

(22) PCT Filed: Sep. 8, 2016

(86) PCT No.: PCT/US2016/050821
§ 371 (c)(1),
(2) Date: Aug. 1, 2018

(87) PCT Pub. No.: WO2018/048411
PCT Pub. Date: Mar. 15, 2018

(65) Prior Publication Data
US 2019/0036689 A1 Jan. 31, 2019

(51) Int. Cl.
*H04L 9/08* (2006.01)
*H04W 12/06* (2021.01)
(Continued)

(52) U.S. Cl.
CPC .......... *H04L 9/0844* (2013.01); *H04L 9/0861* (2013.01); *H04L 9/0866* (2013.01);
(Continued)

(58) Field of Classification Search
CPC ............................ H04L 9/0844; H04L 9/0861
See application file for complete search history.

(56) References Cited

U.S. PATENT DOCUMENTS

| 8,996,877 B2 | 3/2015 | Emelko |
| 2003/0065918 A1* | 4/2003 | Willey .................. H04L 9/0841 713/168 |

(Continued)

FOREIGN PATENT DOCUMENTS

EP 1715613 A1 10/2006

OTHER PUBLICATIONS

Kumar et al., "A Comparative Study of Secure Device Pairing Methods", Pervasive and Mobile Computing, Abstract, vol. 5, Issue 6, Retrieved from Internet: https://www.sciencedirect.com/science/article/pii/S1574119209000650?via%3Dihub, 2009, 2 Pages.

*Primary Examiner* — Farid Homayounmehr
*Assistant Examiner* — Suman Debnath
(74) *Attorney, Agent, or Firm* — Trop Pruner & Hu PC

(57) ABSTRACT

In an example, a method includes pairing a first electronic device and a data relay apparatus associated with a second electronic device to establish a secure wireless communication link therebetween. Each of the first electronic device and the data relay apparatus may be associated with an identifier and a verifier, each verifier being to verify the identifier of the other of the first electronic device or data relay apparatus. The pairing may include mutual verification of an identifier using the verifier, establishing shared key data and using the shared key data to establish a shared secret value for use in determining a derived key.

21 Claims, 3 Drawing Sheets

(51) Int. Cl.
*H04W 12/04* (2021.01)
*H04W 76/14* (2018.01)

(52) U.S. Cl.
CPC ........... *H04L 9/0869* (2013.01); *H04W 12/06* (2013.01); *H04W 76/14* (2018.02); *H04W 12/04* (2013.01)

(56) References Cited

U.S. PATENT DOCUMENTS

| | | |
|---|---|---|
| 2006/0061482 A1 | 3/2006 | Monney et al. |
| 2007/0269040 A1 | 11/2007 | Yuval et al. |
| 2009/0214028 A1* | 8/2009 | Schneider ............. H04L 9/3297 380/44 |
| 2012/0008784 A1 | 1/2012 | Hallam-baker |
| 2012/0303851 A1 | 11/2012 | Tseng et al. |
| 2013/0337739 A1* | 12/2013 | Bernsen ................ H04W 12/04 455/7 |
| 2015/0222439 A1* | 8/2015 | Bhattacharya .......... H04W 4/70 713/169 |
| 2015/0289298 A1* | 10/2015 | Widner ............... H04L 41/0813 455/41.2 |
| 2018/0069699 A1* | 3/2018 | Bowman ................ H04L 9/0841 |
| 2018/0219840 A1* | 8/2018 | Quaglia ................. H04W 4/02 |

* cited by examiner

ESTABLISHING SHARED KEY DATA FOR WIRELESS PAIRING

BACKGROUND

There are many situations in which wireless communications between electronic devices may be established. In some examples, wireless communications between devices are encrypted. Such encryption may be based on a shared secret which electronic devices can use to encrypt and decrypt the data. In other examples, encryption may be based on public key and decryption may be carried out using a private key.

BRIEF DESCRIPTION OF DRAWINGS

Non-limiting examples will now be described with reference to the accompanying drawings, in which.

DETAILED DESCRIPTION

Figure 1:
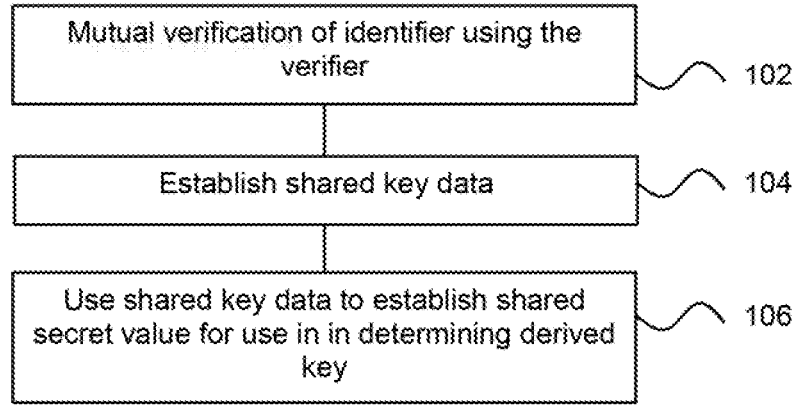
FIG. 1 is a flowchart of an example method of pairing an electronic device and a data relay apparatus.

FIG. 1 shows a flowchart of a method for pairing a first electronic device and a data relay apparatus associated with a second electronic device to establish a secure wireless communication link between the first electronic device and the data relay apparatus. For example, the data relay apparatus may be a 'dongle', such as an external USB dongle. In other examples the data relay apparatus may be n embedded controller or the like.

The first electronic device may for example comprise a 'peripheral' device, intended to extend the capabilities of the second electronic device. For example, the first electronic device may comprise a keyboard, headphones, a speaker, a printer, a video receiver, a mouse, a screen, an appliance (e.g. a washing machine), audio or video equipment, heating, lighting, security systems, or the like. In some examples, the first electronic device may be a remote controlled device.

The second electronic device may for example comprise a computing device, such as a desktop or laptop computer, a mobile telephone, a tablet computing device, gaming apparatus or the like. In other examples, the second device may comprise a remote control device, for example an electronic actuator or controller such as a thermostat (to control a first device which may for example comprise part of a heating system), a key pad associated with a first device comprising a security system or part thereof (e.g. a door lock, alarm and/or security camera), an audio/video control system such as a home theatre control system, or the like. In an example, the second device may comprise a button which, upon actuation, is intended to unlock or open a door, turn on a fan, run a washing program, play music or the like.

In some examples the first electronic device may be resource constrained in the sense that its capabilities to present instructions to a user (for example, visually or audibly) is limited. In some examples, the second electronic device may be resource constrained in the same sense.

As used herein, 'pairing' comprises establishing a trust relationship between devices. Paired devices may agree upon a common secret or set of secrets to communicate with each other in a way that allows the paired devices to communicate securely. In some examples, pairing comprises placing the first electronic device and the second electronic device under common control. For example, the capabilities of the second electronic device may be extended by the capabilities of the first electronic device, which may provide an input (e.g. a keyboard, mouse) or output (e.g. a screen, headphones, printer, speakers, light, lock, etc.) of the second electronic device.

In this example, each of the first electronic device and the data relay apparatus is associated with an identifier and a verifier, each verifier being to verify the identifier of the other device or apparatus. In some examples, at least an identifier may be held in the respective memories of the device and apparatus.

For example, an identifier may comprise a security 'token', which is used to identify (in some examples, uniquely identify) the device/apparatus and the verifier may be to verify such a token. In an example which uses asymmetric cryptography, the verifier may comprise a public key, such as an Elliptic Curve Cryptography (ECC) public key and its certificate, and the identifier could comprise the corresponding private key. One of the first electronic device and the data relay apparatus could digitally sign a message using the private key and the other may verify this signature using the public key. The verifying entity could also inspect the certificate to see if it is signed by a trusted entity, for example, the manufacturer's certificate authority (CA) using the CA's public key, and verify that the certificate comes from a trusted source (for example, the device manufacturer).

In another example the identifier may be a symmetric key (i.e. a key which is shared between the device and the apparatus), and in some cases the key may be unique for each pair of devices. In such an example, the verifier may comprise a keyed-hash message authentication code (HMAC) derived using the identical symmetric key. This can be implemented using only symmetric cryptography and hashes (which is generally simpler than asymmetric cryptography) but compromise of the key of one of the first electronic device and the data relay apparatus compromises the other in the pair.

While in some examples multiple devices/apparatus (for example all devices/apparatus in a class) may have the same identifier, in some examples the identifiers may be unique such that if one identifier becomes known, other devices/apparatus are not compromised. However, in particular in the example of symmetric encryption, providing at least some devices/apparatus with the same identifier means that any example of an electronic device having this identifier could pair with any data relay apparatus having the appropriate verifier, which may be convenient in some circumstances.

In some examples, rather than providing a verifier held in a memory of a device/apparatus, the verification of an identity may be carried out by a third party, for example a certifying authority. In some examples the identity of the certifying authority is itself verifiable. For example, the verification of a first electronic device could be carried out by a mediating entity in which the data relay apparatus establishes, or has established, trust (or vice versa).

Identifiers and, in some examples, verifiers, may be written to a memory of a device or apparatus during manufacturing thereof, or at some other time, for example, being generated on first installation, or at each boot. In some examples, care may be taken to ensure that, at the time an association between an identifier and a verifier is established, any eavesdropping is prevented. Supplying the verifiers and identifiers during manufacture may be adopted as this represents an opportunity to establish the association in a controlled environment. There are different methods for implementing the generation of identifiers and verifiers with different security-complexity trade-offs. In some examples, the identifiers (and in some examples, verifiers) may be protected from easy extraction, for example being installed in tamperproof memory, and/or being inaccessible to devices such as the second electronic device. This may prevent or restrict impersonation attacks where an attacker copies the identifier to masquerade as a legitimate device/apparatus.

In some examples, more than one identifier and/or verifier may be provided as different users may use different combinations of identifiers and verifiers based on business or personal use cases. As mentioned above, for example, devices with constrained long term storage and no access to asymmetric cryptography, symmetric keys and HMACs can be used to verify a class of devices or a single (or multiple) paired devices. The drawback of this approach is that theft of a key could compromise all devices/apparatus in that class or group of devices sharing the key.

The identifier and verifier may provide a binding between the first electronic device and the data relay apparatus (or more generally between pairing devices) so that each can identify the acceptable endpoint for communications sent thereby.

In an example, a method of pairing comprises, in block 102, mutual verification of an identifier using the verifier. In other words, each of the first electronic device and the data relay apparatus verify the identity of the other, either directly or via a trusted third party such as a certifying authority. For example, the identifiers (which may be encrypted) may be exchanged wirelessly between the device and apparatus, or may be sent to a trusted third party such as a certifying authority.

In block 104, assuming the identities have been mutually verified, shared key data is established. In some examples, this method may be triggered by a user, for example by pressing a button on the first or second electronic device or on the data relay apparatus, or through some other means. In some examples, such shared key data may be established using any key exchange procedure, for example Diffie-Hellman key exchange, Password Authenticated Key Exchange (PAKE), Internet Key Exchange (IKE) or the like. Such shared key data may form the basis of a long-term key which is used to provide a binding between the first electronic device and the data relay apparatus and provides a trusted secret negotiated between them. In some examples, the shared key data may be stored in a persistent manner, for example, in long-term memory. In other examples, such shared key data may be generated on demand. In some examples, the shared key data may be sufficient for generating subsequent keys in itself. In other examples (for example, where long-term memory resources are limited) the shared key data may be used as a seed or source to generate additional shared key data on demand, for example using a pseudorandom number generator or key derivation function which is common to both the first electronic device and the date relay apparatus. Such additional shared key data may be abandoned, for example on timeout, shutdown or reboot.

The shared key data may for ample be stored in an internal (in some examples, non-volatile) memory of the first electronic device, and either in a memory of the data relay apparatus or a memory of the second electronic devices. In some examples, the method of data storage may be selected such that corruption is minimized and/or corruption (and/or compromise) can be easily detected. The data may be stored so as to be protected from theft (copying) and loss.

Block 106 comprises using the shared key data to establish a shared secret value for use in determining a derived key (which may comprise, or form the basis of, a session key). For example, the shared secret value may comprise a symmetric key or some shared secret value used in determining a derived key. Thus, the shared key data acts as a key-derivation-key to produce at least one additional derived key. Compromise of a derived key therefore may not affect the security of the shared key data. In some examples, the function for determining a derived key may be such that it is computationally infeasible to reverse it.

In some examples, the shared key data may be held and reused unless lost or corrupted, or until the first electronic device and the data relay apparatus are 'unpaired' or re-paired.

Establishing the shared secret value may employ a key derivation function, for example a hash based key derivation function, which is common to both the first electronic device and the data relay apparatus, for example using a pseudo-random tune ion which is known to both.

In some examples, the shared secret value and/or any derived key may be a bit string of at least 128 bits. In some examples, if the generated key data is smaller than this, it may be used to seed a pseudo random number generator that can produce 128 bit strings. Use of low entropy strings to generate larger keys through the use of hash functions or key derivation functions may be avoided as the security of the resulting keys are no greater than the input string.

Secure pairing of devices and apparatus may be particularly challenging where the devices are resource constrained, and for example can provide minimal or no user feedback or instructions (such as a keyboard). As a result, security protocols have tended to rely on link of sight communications and/or user presence to enhance security of pairing but this can be cumbersome and vulnerable. In other examples, security may be compromised for convenience. The method of FIG. 1 allows mutual identity verification and thereafter may use a key exchange protocol without fear of a 'man in the middle' attack with no or minimal user input. Moreover, further keys are derived from the shared key data and it is those keys which form the basis of data traffic encryption without requiring re-pairing.

Figure 2:
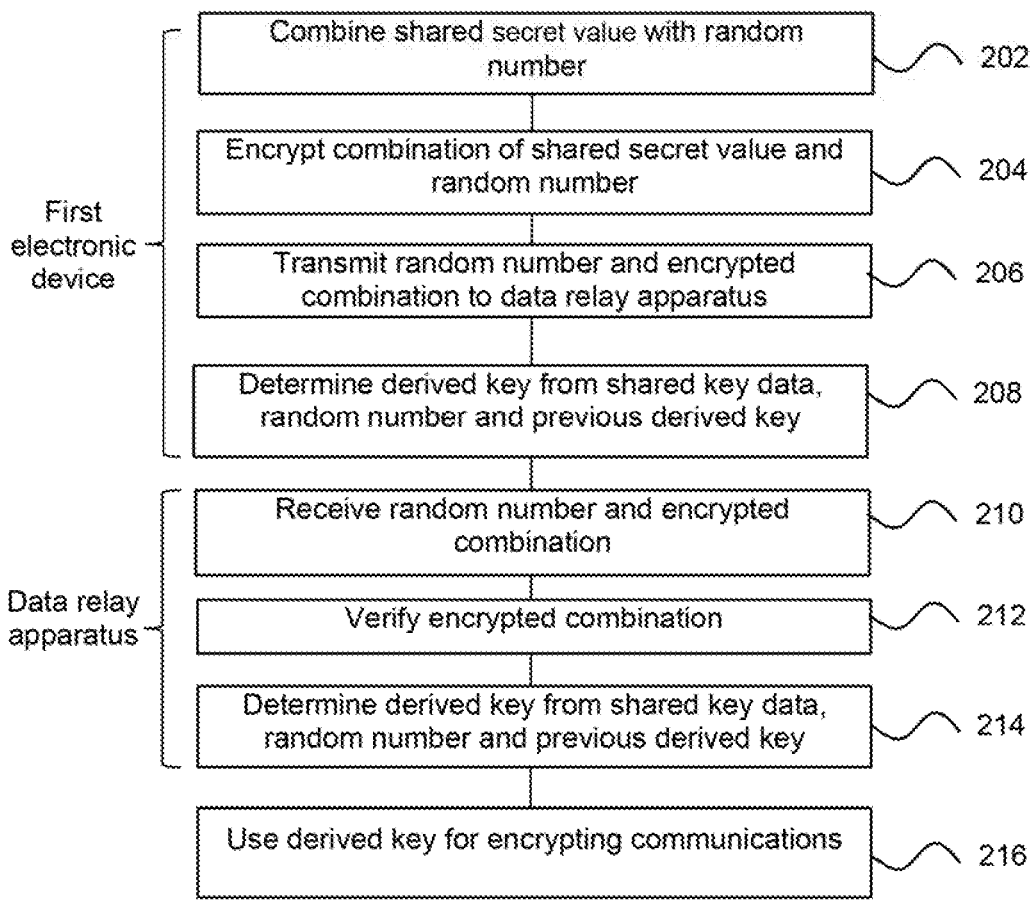
FIG. 2 is a flowchart of an example method of deriving a key for encrypting communications between a paired electronic device and data relay apparatus.

FIG. 2 shows an example of, a method for determining a derived key using the shared key data. The derived key may comprise a session key for use in encrypting data for a period. For example the process for determining a derived key may be carried out periodically, on boot, following a timeout, following a user attempt to initiate use of the first electronic device or the like. In this way, instead of using the shared key data to encrypt traffic between the first electronic device and the data relay apparatus, an 'ephemeral' session key is used to encrypt the data. This protects the security of each session's key from compromise of a previous session key, and also protects the security of the shared key data.

In this example, blocks 202 to 208 are carried out at the first electronic device. In block 202, the shared secret value is combined with a random number (which may be generated at the first electronic device as further set out below). Block 204 comprises encrypting the combined shared secret value and the random number. For example, this may comprise determining a hash of the combined data, which may be a keyed-hash message authentication code (HMAC), or the like. The random number may serve as an 'initialisation vector', and may be provided using a true random number generator, a pseudorandom number generator seeded from a true random number generator, or some other source of entropy such as a user or sensor input. The resources applied to providing the random number may be a tradeoff with security as a weak source of randomness can permit an attacker to guess the next random number to begin brute force attacks ahead of time.

Block 206 comprises transmitting (i) the encrypted combination of the shared secret value and a random number and (ii) the random number (unencrypted), to the data relay apparatus. These may be sent together or separately. Processing of this data at (in this example) the data relay apparatus is described below in relation to blocks 210 to 214.

Block 208 comprises determining the derived key based on the shared key data, the random number and a previous derived key. For example, each of the shared key data, the random number and a previous derived key may provide part of an input to a key derivation function in feedback mode. For the first derived key, arbitrary data may be used as 'previous' key data, for example a string of 0s, in some examples, block 208 may occur after it is confirmed by the data relay apparatus that verification of the identity of the first electronic device is successful.

In this example, blocks 210 to 214 are carried out at the data relay apparatus. Block 210 comprises receiving the random number and the encrypted combination of the shared secret value and the random number. The encrypted combination is verified in block 212. This therefore allows the request to establish a derived key to be verified without directly exposing shared key data. For example, the data relay apparatus may combine the version of the shared secret value (which it may hold or may generate from the shared key data) with the received random number, encrypt this using the same function as was used by the first electronic device and compare the two encrypted combinations to determine if they match. Assuming that verification is successful, the method continues in block 214 by determining a derived key based on the shared key data, the random number and a previous derived key. This may be carried out as described in relation to block 208 above.

In block 216, either or both of the data relay apparatus and the first electronic device use the derived key for encrypting communications therebetween.

The roles of the data relay apparatus and the first electronic device may be reversed such that the data relay apparatus carries out blocks 202 to 208 and the first electronic device carries out blocks 210 to 214.

Figure 3:
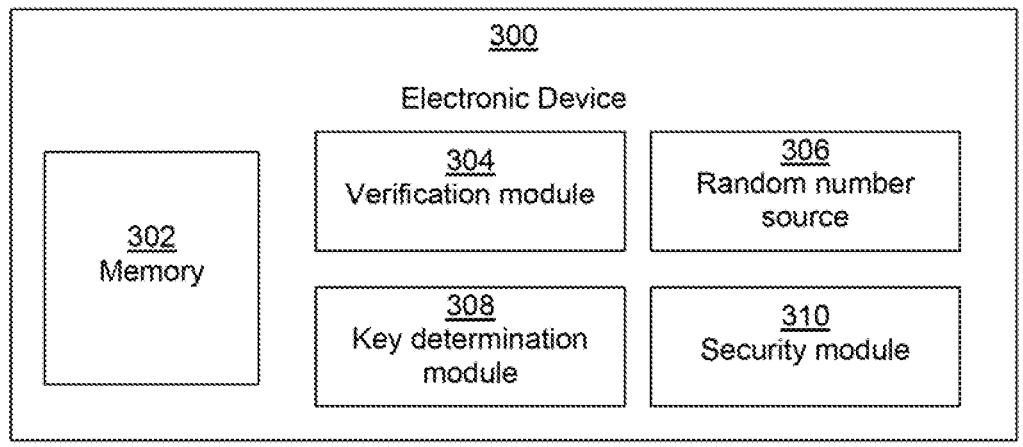
FIG. 3 is a simplified schematic drawing of an example electronic device.

FIG. 3 is a schematic example of a first pairing electronic device 300 comprising a memory 302, a verification module 304, a random number source 306, a key determination module 308 and a security module 310. In some examples, the first pairing electronic device 300 is an example of a first electronic device as discussed above. In some such examples, the first pairing electronic device 300 may exchange data with an electronic device (for example, a second electronic device as described above) which is physically connected to an associated data relay apparatus (i.e. a host electronic device of the second pairing electronic device). In some examples, the first pairing electronic device 300 is an example of a data relay apparatus. In some examples, the second pairing electronic device may be an example of a data relay apparatus, or may be an example of a first electronic device.

In some examples, the first pairing electronic device 300 is a 'resource constrained device' in the sense that it may have constrained processing capabilities and/or constrained user interfaces. The first pairing electronic device 300 may be limited in its capability to present instructions to a user (for example, visual or audio instructions), or such capabilities may be non-existent. In some examples, the first pairing electronic device 300 may have constrained or no display capability (an example of constrained display capability may, for example, comprise a light which may flash or otherwise indicate a status, but no display screen which is capable of displaying text, or audio output with is capable of issuing an audio instruction). In some examples, the first pairing electronic device 300 is a screen-less device. In some examples, the first pairing electronic device 300 is a Human Computer Interaction device, a sensor, any device that extends functionality, or a device which that gives the ability for a person to control another apparatus remotely.

In such devices, secure pairing is complicated by the lack of ease with which guidance can be provided to a user. For example, the user cannot be easily instructed to enter a password, as there may be no screen or other prompt to do so provided by the first pairing electronic device 300.

The memory 302 stores an identifier and, in some examples, a verifier to verify an identity of an associated second pairing electronic device (which may for example be a first electronic device or a data relay apparatus).

The verification module 304 verifies the identity of the second pairing electronic device, for example using the verifier (where provided), or by reference to a trusted third party.

The random number source 306 may comprise any form of random number source, for example comprising at a true random number generator (in some examples, to provide a seed for pseudorandom number generator). In another example, the random number source 306 utilise a user input. For example, if the electronic device is a keyboard, the user may be asked to strike keys to provide a source of entropy. In other examples, a user may make a noise into a microphone, shake a device comprising at least one accelerometer or provide some other source at entropy as a user input. In other examples, a random number may be generated based on electric noise, an environmental event such as a change in light levels or a movement of the electronic device, in which case the random number source 306 may comprise a sensor, for example, a light sensor or an accelerometer, or the like.

The key determination module 308 establishes shared key data with the second pairing electronic device, and may also establish a shared secret value with the second pairing electronic device (for example, through Diffie-Hellman (or some other) key exchange and a key derivation function respectively). In some examples, the key determination module 308 may determine the derived key based on a random number provided by the random number source 306, the shared key data and a previous derived key, as has been described above. In some examples, the key determination module 308 sends the random number provided by the random number source and an encrypted combination of the random number provided by the random number source 306 and the shared secret value to the second pairing electronic device.

The security module 310 encrypts data sent to the associated second pairing electronic device and decrypts data received therefrom using a derived key. In some examples, the security module 310 may construct a data packet for sending a data payload to the associated second pairing electronic device. An example data packet may comprise: (i) an encrypted combination of the payload and a random number provided by the random number source 306 for that data packet, wherein the combination is encrypted using the derived key, and (ii) the (unencrypted) random number provided by the random number source 306 for that data packet.

The random number acts as an initialisation vector, and in some examples, a new random number may be generated for each packet sent from the device 300. Preparing data packets in this way may add entropy to the data packets and thus in examples when the data to be communicated may have low entropy (for example, keyboard data or the like, in which inputs are constrained by the keys provided and data packets may transfer the same data repeatedly), this may increase the security of the data transfer. In some examples, a sequence counter may be synchronized between the first pairing electronic device 300 and the second pairing electronic device (for example, the sequence number may be negotiated at the same time as a key exchange, or subsequently). The sequence counter output may be combined with the random number to counter precomputation attacks that may be possible with a counter alone. In such an example, the encrypted portion of the data packet may comprise an encrypted combination of the payload, the random number provided for that data packet, and a sequence number. In some examples, so as to return data packets in the same manner, a second pairing electronic device may also have access to a random number source and/or sequence counter, which may be provided internally thereto, or in some examples by the second electronic device, as is set out in greater detail below.

Once the packet is constructed, it may be encrypted using the derived key. In some examples, an authenticated encryption scheme such as AES-CCM or AES-OCB may be used to provide message confidentially, integrity, and authentication. In other examples, other schemes such as AES-CBC may be used. A second pairing electronic device may decrypt the packet (and verify if using AES-CCM) and extract the data from the random number, which may be sent and received unencrypted along with the encrypted data.

Figure 4:
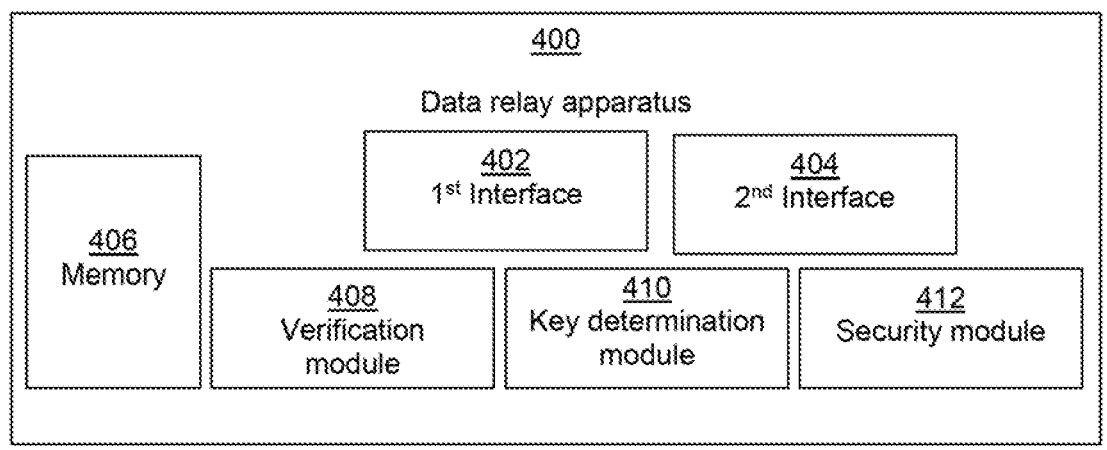
FIG. 4 is a simplified schematic drawing of an example data relay apparatus.

FIG. 4 is an example of a data relay apparatus 400 comprising a first interface 402 for wireless communication with a first electronic device; and a second interface 404 for communication with a second electronic device. The first and second electronic devices may be as described in relation to FIGS. 1 and 2 above. In some examples, the first device may be an electronic device 300 as described in relation to FIG. 3. In some examples, the data relay apparatus 400 may have any of the features of the electronic device 300 as described in relation to FIG. 3 (and vice versa). The data relay apparatus 400 is to operatively extend the functionality of the second electronic device to include the functionality of the first electronic device and to relay data between the first and second electronic devices, wherein the data is encrypted for wireless communication with the first electronic device using a derived key. In some examples, the first electronic device may provide an input and/or output of the second electronic device once paired to the data relay apparatus 400.

The first interface 402 may comprise any wireless interface, for example allowing communication across a wireless network such as a WiFi, Bluetooth, ZigBee, Near Field Communication (NFC) network, or the like. As with any wireless connection, there is at least a possibility that a third party may be able to intercept such communications. The second interface 404 may be wired interface, for example comprising a physical connection between the data relay apparatus 400 and the second electronic device. In some examples, the data relay apparatus 400 may be for installation within, or to be connected to, the second electronic device. For example, the second electronic device may comprise a computing device such as a laptop or desktop computer, a tablet, a mobile phone or the like, and the data relay apparatus 400 may be connected to communication port of the second electronic device, for example a Universal Serial Bus (USB) port, a FireWire port, a VGA port, a PS/3 port, a Small Computer System interface (SCSI) port, or the like. In other examples, the data relay apparatus 400 may comprise an embedded wireless controller of the second electronic device. The communication between the data relay apparatus 400 and the second electronic device may be established in any way, for example using a hand-shake procedure or the like.

The data relay apparatus 400 further comprises a memory 406, verification module 408, a key determination module 410 and a security module 412.

The memory 406 holds an identifier of the data relay apparatus 400, and in some examples a verifier to verify the identity of the first electronic device.

The verification module 408 verifies the identity of the first electronic device for example using the identifier or by reference to a trusted third party. In some examples, the verification module 408 may also verify a request to establish a derived key from the first electronic device, the request comprising a value (e.g. a random number generated by the first electronic device) and an encrypted portion. The verification module 408 may verify that the encrypted portion is an encrypted combination of the value and the shared secret value, for example using the techniques set out in relation to block 212 above.

The key determination module 410 establishes shared key data and a shared secret value with the first electronic device (for example, through Diffie-Hellman (or some other) key exchange and a key derivation function respectively). In some examples, the key determination module 410 also determines a derived key using a value received via the first interface, the shared key data, and a previous derived key. For example this may be derived as set out in relation to block 214 above.

The security module 412 encrypts data to be sent to the associated first electronic device and decrypts data received therefrom using a derived key. In some examples this may comprise constructing a data packet for sending a data payload to the first electronic device. As set out above, an example data packet may comprise: (i) an encrypted combination of the payload and a random number provided by a random number source for that data packet (and in some examples, a sequence number), wherein the combination is encrypted using the derived key, and (ii) the (unencrypted) random number provided by the random number source for that data packet. In such examples, a data relay apparatus may be operatively associated with a random number source. In some examples, the random number source may be provided internally thereto. In some examples, the random number source may be provided by the second electronic device, or a random number may be supplied in some other manner. In such examples, the random number source may have any of the features described in relation to the random number source 306 above.

Figure 5:
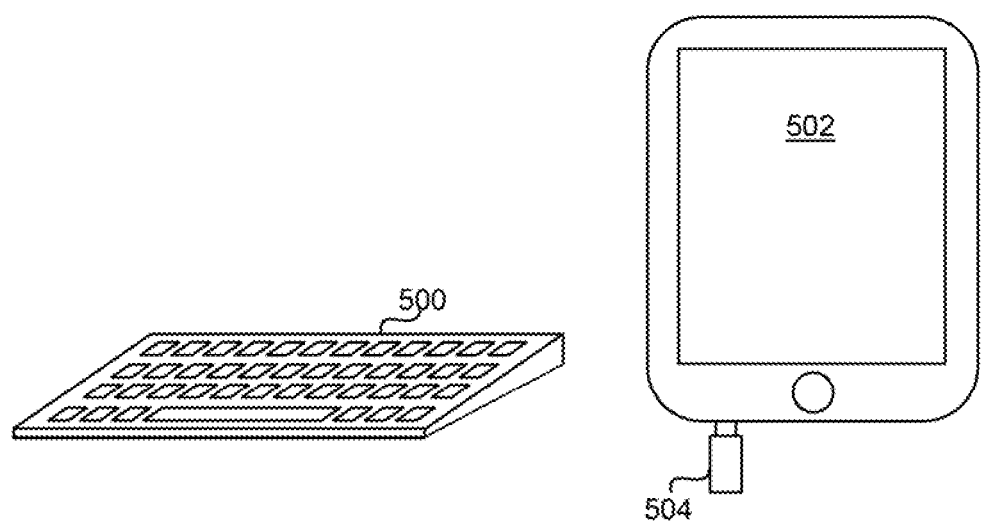
FIG. 5 is a simplified schematic of an example data relay apparatus in communication with a first and second electronic device.

FIG. 5 is a schematic example of a first electronic device 500, in this example a keyboard, which is to extend the capabilities of a second electronic device 502, in this example, a tablet computer. The data relay apparatus 504 comprises an external 'dongle', which is plugged into a port, in this example a USB port, of the second electronic device. In other examples, the first electronic device 500 may comprise, for example, an audio headset, fitness tracker such as a pedometer, appliance (for example, washing machine, light switch, door lock, scales, or the like), wearable technology (for example a, smart watch, jewelry, bag, etc.) or the like, in other examples, the data relay apparatus 504 comprises an alternative external dongle device, or may comprise a wireless controller which is internal to the second electronic device 502. In other examples, the second electronic device 502 may comprise another form of computing apparatus, a control apparatus for a first electronic device 500, a device to receive an input from the first electronic device 500 or the like.

It may be noted that, in this example, the wireless pairing between the data relay apparatus 504 and the first electronic device 500 places the first and second electronic devices 500, 502 under common user control.

Examples in the present disclosure can be provided as methods, systems or machine readable instructions in combination with a processor. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules (for example, the verification modules 304, 408, the key determination modules 308, 410, the security modules 310, 412, the random number source 306, and the first or second interface 402, 404) of the data relay apparatus 400 and/or devices 300, 500, 502 may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and many alternative implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
pairing a first electronic device and a data relay apparatus associated with a second electronic device to establish a secure wireless communication link between the first electronic device and the data relay apparatus, wherein the pairing comprises:
verifying, by a verifier in the first electronic device, an identifier of the data relay apparatus,
establishing shared key data, and
using the shared key data to establish a shared secret value;
combining the shared secret value and a random number;
encrypting the combination of the shared secret value and the random number, the encrypting producing an encrypted combination;
transmitting, by the first electronic device to the data relay apparatus, the random number and the encrypted combination; and
determining a derived key based on the shared key data, the random number, and a previous derived key.

2. The method of claim 1 further comprising:
receiving, by the first electronic device from the data relay apparatus, a random number and an encrypted combination; and
verifying the encrypted combination received from the data relay apparatus,
wherein the determining of the derived key is in response to verifying the encrypted combination received from the data relay apparatus.

3. The method of claim 2, wherein the verifying of the encrypted combination received from the data relay apparatus comprises:

computing a further encrypted combination based on encrypting a combination of the random number received from the data relay apparatus and the shared secret value, and comparing the encrypted combination received from the data relay apparatus with the further encrypted combination.

4. The method of claim 1, further comprising the first electronic device using the derived key for encrypting communications with the data relay apparatus.

5. The method of claim 1, wherein the transmitting of the random number to the data relay apparatus comprises transmitting the random number in unencrypted form.

6. The method of claim 1, wherein the transmitting of the random number and the encrypted combination to the data relay apparatus is for verification of the encrypted combination at the data relay apparatus using the random number.

7. The method of claim 1, wherein the first electronic device is without a display screen.

8. A first pairing electronic device comprising:
a processor;
a random number source;
a non-transitory storage medium storing instructions executable on the processor to:
verify an identity of a second pairing electronic device;
establish shared key data with the second pairing electronic device,
establish a shared secret value with the second pairing electronic device;
send, to the second pairing electronic device:
a random number provided by the random number source, and
an encrypted combination of the shared secret value and the random number; and
encrypt data sent to the second pairing electronic device using a derived key, wherein the derived key is based on the random number provided by the random number source.

9. The first pairing electronic device of claim 8, further comprising a memory further to store a verifier to verify the identity of the second pairing electronic device.

10. The first pairing electronic device of claim 8, wherein the instructions are executable on the processor to determine the derived key based on the random number provided by the random number source, the shared key data, and a previous derived key.

11. The first pairing electronic device of claim 8, wherein the instructions are executable on the processor to send the random number in unencrypted form to the second pairing electronic device.

12. The first pairing electronic device of claim 8, wherein the random number source comprises a true random number generator or a pseudorandom number generator.

13. The first pairing electronic device of claim 8, wherein the first pairing electronic device is to exchange data with a host electronic device that is physically connected to the second pairing electronic device.

14. The first pairing electronic device of claim 8, wherein the instructions are executable on the processor to:
construct a data packet for sending a data payload to the second pairing electronic device, the data packet comprising:
an encrypted combination of the data payload and a random number provided by the random number source for the data packet, wherein the encrypted combination of the data payload and the random number for the data packet is encrypted using the derived key, and
the random number provided by the random number source for the data packet.

15. The first pairing electronic device of claim 8, wherein the instructions are executable on the processor to send, to the second pairing electronic device, the random number and the encrypted combination of the shared secret value and the random number for verification of the encrypted combination of the shared secret value and the random number at the second pairing electronic device.

16. The first pairing electronic device of claim 8, wherein the random number source comprises a sensor.

17. The first pairing electronic device of claim 8, wherein the first pairing electronic device is without a display screen.

18. A data relay apparatus comprising:
a first interface for wireless communication with a first electronic device;
a second interface for communication with a second electronic device;
a processor; and
a non-transitory storage medium storing instructions executable on the processor to:
verify an identity of the first electronic device when performing wireless pairing with the first electronic device;
establish shared key data and a shared secret value with the first electronic device;
cause sending, to the second electronic device, of:
a random number, and
an encrypted combination of the shared secret value and the random number;
derive a derived key using the shared key data and the random number; and
encrypt data sent to the first electronic device using the derived key,
wherein the data relay apparatus is to operatively extend a functionality of the second electronic device to include a functionality of the first electronic device and to relay data between the first and second electronic devices.

19. The data relay apparatus of claim 18, further comprising a memory to store a verifier to verify the identity of the first electronic device.

20. The data relay apparatus of claim 18, wherein the instructions are executable on the processor to verify a request to establish the derived key from the first electronic device, the request comprising a value and an encrypted portion, and wherein the instructions are to verify that the encrypted portion is an encrypted combination of the value and the shared secret value.

21. The data relay apparatus of claim 18, wherein the instructions are executable on the processor to derive the derived key using the shared key data, the random number, and a previous derived key.

* * * * *